(12) United States Patent
Zhang et al.

(10) Patent No.: US 10,833,770 B2
(45) Date of Patent: Nov. 10, 2020

(54) OPTICAL FIBER NONLINEARITY COMPENSATION USING NEURAL NETWORKS

(71) Applicant: NEC Laboratories America, Inc., Princeton, NJ (US)

(72) Inventors: Shaoliang Zhang, Princeton, NJ (US); Fatih Yaman, Princeton, NJ (US); Eduardo Rodriguez, Tokyo (JP); Yoshihisa Inada, Tokyo (JP); Kohei Nakamura, Tokyo (JP); Takanori Inoue, Tokyo (JP)

(73) Assignee: NEC Corporation (JP)

(*) Notice: Subject to any disclaimer, the term of this patent is extended or adjusted under 35 U.S.C. 154(b) by 0 days.

(21) Appl. No.: 16/449,319

(22) Filed: Jun. 21, 2019

(65) Prior Publication Data

US 2019/0393965 A1   Dec. 26, 2019

Related U.S. Application Data

(60) Provisional application No. 62/688,465, filed on Jun. 22, 2018.

(51) Int. Cl.
*H04B 10/2543* (2013.01)
*G06K 9/62* (2006.01)
*H04L 27/26* (2006.01)
*G06N 3/08* (2006.01)
*H04B 10/2531* (2013.01)
(Continued)

(52) U.S. Cl.
CPC ....... *H04B 10/6163* (2013.01); *G06K 9/6265* (2013.01); *G06N 3/086* (2013.01);
(Continued)

(58) Field of Classification Search
None
See application file for complete search history.

(56) References Cited

U.S. PATENT DOCUMENTS

2007/0263748 A1* 11/2007 Mesecher ............ H01Q 1/282
375/299
2012/0082468 A1* 4/2012 Qian .................. H04B 10/2543
398/188
(Continued)

OTHER PUBLICATIONS

Fangyuang Zhang et al "Blind Adaptive Digital Backpropagation for Fiber Nonlinearity Compensation" in Journal of Lightwave Technology, May 1, 2018, vol. 36, No. 9, pp. 1746-1756, publication date of IEEE: Dec. 19, 2017. Current version date: Feb. 27, 2018, URL: https://ieeeplore.ieee.org/document/8226758. See abstract; pp. 1746-1751; and figures 1(A)4, 9(a)-(b).
(Continued)

*Primary Examiner* — Darren E Wolf
(74) *Attorney, Agent, or Firm* — Joseph Kolodka

(57) ABSTRACT

Aspects of the present disclosure describe systems, methods and structures for optical fiber nonlinearity compensation using neural networks that advantageously employ machine learning (ML) algorithms for nonlinearity compensation (NLC) that advantageously provide a system-agnostic model independent of link parameters, and yet still achieve a similar or better performance at a lower complexity as compared with prior-art methods. Systems, methods, and structures according to aspects of the present disclosure include a data-driven model using the neural network (NN) to predict received signal nonlinearity without prior knowledge of the link parameters. Operationally, the NN is provided with intra-channel cross-phase modulation (IXPM) and intra-channel four-wave mixing (IFWM) triplets that advantageously provide a more direct pathway to underlying nonlinear interactions.

10 Claims, 16 Drawing Sheets

(51) Int. Cl.
*H04B 10/61* (2013.01)
*H04L 27/20* (2006.01)
*H04B 10/40* (2013.01)
*H04B 10/50* (2013.01)
*H04B 10/60* (2013.01)

(52) U.S. Cl.
CPC ..... *H04B 10/2531* (2013.01); *H04B 10/2543* (2013.01); *H04L 27/2096* (2013.01); *H04L 27/2627* (2013.01); *H04B 10/40* (2013.01); *H04B 10/50* (2013.01); *H04B 10/60* (2013.01)

(56) References Cited

U.S. PATENT DOCUMENTS

| | | | | |
|---|---|---|---|---|
| 2012/0263464 A1* | 10/2012 | Koike-Akino | ..... | H04B 10/6162 398/65 |
| 2013/0286949 A1* | 10/2013 | Tomeba | ...... | H04B 7/0452 370/328 |
| 2015/0067158 A1* | 3/2015 | Naseh | ...... | H04L 41/0816 709/224 |
| 2016/0127047 A1* | 5/2016 | Napoli | ...... | H04B 10/2543 398/192 |

OTHER PUBLICATIONS

Shotaro Owaki et al. "Experimental Demonstation of SPM Compensation Based on Digital Signal Processing Using a Three-Layer Neural-Network for 40-Gbit/s Optical 16QAM Signal" In IEICE Communication Express. Oct. 24, 2017, vol. 1, pp. 1-6, online ISSN: 2187-0136. https://www.jstage.jst.go.jp/article/comex/advpub/0/advpub_2017XBL0148/_article/-char/en?—See abstract, paragraphs 8-14, 68-74; and figure 5.

* cited by examiner

US 10,833,770 B2

OPTICAL FIBER NONLINEARITY COMPENSATION USING NEURAL NETWORKS

CROSS REFERENCE TO RELATED APPLICATIONS

This application claims the benefit of Untied States Provisional Patent Application Ser. No. 62/688,465 filed 22 Jun. 2018 the entire contents of which is incorporated by reference as if set forth at length herein.

TECHNICAL FIELD

This disclosure relates generally to optical communications systems, methods, and structures. More particularly, it describes optical fiber nonlinearity compensation (NLC) method(s) employing a neural network (NN).

BACKGROUND

As is known in the optical communications arts, optical fiber nonlinearity acts as a significant impairment of optical fiber communications and limits the maximum optical power launched into optical fiber. In response, the art has developed digital backpropagation methods (DBP) and algorithms that mitigate fiber Kerr nonlinearity by emulating signal transmission along a fiber link at several DBP steps per span. To simplify computational complexity of DBP, the art has developed schemes wherein signal backpropagation over several spans are collapsed together into a single, DBP step. More recently, a deep-learning approach has been described in the art that attempts to optimize the number of steps in the DBP algorithm to allow less DBP steps/span. Notwithstanding such developments, DBP algorithms and methods built thereupon require accurate knowledge of transmission link parameters—such as dispersion, fiber nonlinearity and span length—which may not be readily available I a software defined mesh network.

SUMMARY

An advance in the art is made according to aspects of the present disclosure directed to an improved method for nonlinearity compensation (NLC). In sharp contrast to the prior art, such method according to the present disclosure advantageously provides lower-complexity, nonlinearity compensation employing our machine learning algorithms that advantageously provide a system-agnostic model-independent of link parameters—and yet still achieve a similar or better performance at a lower complexity as compared to the prior art.

Furthermore, systems, methods, and structures according to aspects of the present disclosure include a data-driven model using the neural network (NN) to predict received signal nonlinearity without prior knowledge of the link parameters.

Operationally, the NN is provided with intra-channel cross-phase modulation (IXPM) and intra-channel four-wave mixing (IFWM) triplets that advantageously provide a more direct pathway to underlying nonlinear interactions.

In further contrast to the art, due in part to a nonlinear activation function in neurons and multiple hidden layers, our NN architecture according to the present disclosure can advantageously explore triplets' correlation thus constructing a better interaction among the triplets to have equivalent $6^{th}$-order and/or even $9^{th}$-order correlation.

Finally, without computing triplets online, we demonstrate that low-complexity neural network nonlinearity compensation (NN-NLC) according to the present disclosure can be implemented at the transmitter by using look-up tables (LUT) capable of providing >0.5 dB Q improvement using single channel 32Gbaud dual-polarization (DP) 16QAM over 2800 km dispersion-unmanaged transmission. At a similar complexity at the receiver side as filtered-DBP—we further experimentally show that NN-NLC achieves 0.15 b/s/2-polarization generalized mutual information (GMI) improvement over CDC only after 11,000 km field fiber transmission using probabilistically-shaped (PS) 64 quadrature amplitude modulation (64QAM).

BRIEF DESCRIPTION OF THE DRAWING

A more complete understanding of the present disclosure may be realized by reference to the accompanying drawing in which:

FIG. 2(A), FIG. 2(B), and FIG. 2(C) are plots illustrating de-noise averaging of training datasets at SNR-18.4 dB after 2800 kM in which: FIG. 2(A) is a plot of Q-factor vs. Number of Averaging of a training dataset at SNR indicating the impact of the number of acquired waveforms on the Q-factor and constellation of the training dataset received at ~2 dB higher channel power than optimum after 2800; FIG. 2(B) is a saturation curve and FIG. 2(C) is a saturation curve showing cleaner constellation according to aspects of the present disclosure;

FIG. 3(A) Nt=615; and FIG. 3(B) after iterative trimming (k=−22 dB); wherein FIG. 3(C) shows an optimized NN architecture with 2 hidden layers and FIG. 3(D) a block diagram of a NN-NLC for pol-H only according to aspects of the present disclosure;

FIG. 4(A) the impact of trimming threshold k on NN-NLC at a receiver side after 2800 km transmission; FIG. 4(B) the performance comparison between NN-NLC at transmitter and receiver side and filtered DBP at different spans per step; FIG. 4(C) recovered constellation at receiver side, with FIG. 4(D); and without FIG. 4(E) transmitter sider NN-NLC received SNR=18.4 dB @ 2800 km transmission according to aspects of the present disclosure;

FIG. 6(A) the transmitter and receiver spectra; FIG. 6(B) the received PS 64QAM constellation; FIG. 6(C) compares the performance of NN-NLC and filtered DBP with respect to CDC only as a function of computational complexity; and FIG. 6(D) is a density map of the input layer nodes with weights after training with 240 triplets according to aspects of the present disclosure;

Figure 1A:
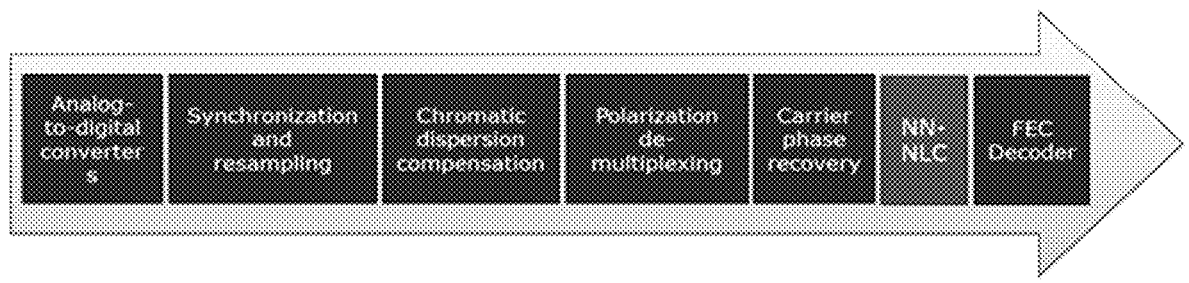
FIG. 1(A) is a schematic flow diagram illustrating digital signal processing (DSP) steps at a receiver according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we begin by noting that advances in deep learning algorithms has revitalized an overwhelming interest in artificial intelligence (AI) and the creation of practical and innovative applications in any number of different fields. Of particular interest, a number of researchers have applied off-the-shelf machine learning (ML) models directly to networking and in particular optical transmission nonlinearity compensation (NLC), optical network performance monitoring, and optical network planning.

As known by those skilled in the art, fiber Kerr nonlinearity is the most fundamental limit to the maximum achievable information rate of any optical fiber transmission system and is well-known to be characterized by nonlinear Schrodinger equation (NLSE). As such, a digital backpropagation (DBP) algorithm has been disclosed to mitigate the fiber Kerr nonlinearity by emulating optical signal transmission along a conceptual optical fiber link at several DBP steps per span. As is known further—in order to significantly simplify the computation complexity of DBP—the signal backpropagation over several spans is collapsed together into single DBP step in a filtered DBP scheme due to low-pass filtering of the signals' intensity.

Recently, a deep-learning algorithm has been introduced by the art in simulations in an attempt to optimize the number of steps of the DBP algorithm and to allow less DBP steps per span. Unfortunately, however, the DBP algorithm and its variants require accurate knowledge of the transmission link parameters, such as dispersion, fiber nonlinearity and span length, which may be not available in a contemporary software defined mesh network.

With this background in place, we disclose herein systems, methods, and structures for optical nonlinearity compensation using ML algorithms according to aspects of the present disclosure. As we shall show and describe, particular advantages of using ML algorithms for NLC instead of using existing DBP methods are that, they can advantageously provide a system-agnostic model independent of the link parameters, and that they may achieve a similar or better performance at a lower complexity.

As we shall describe, our disclosure includes a data-driven model using a neural network (NN) to predict the received signal nonlinearity without prior knowledge of the link parameters. The NN is fed with intra-channel cross-phase modulation (IXPM) and intra-channel four-wave mixing (IFWM) triplets capable of providing a more direct pathway to the underlying nonlinear interactions.

We note further that IXPM and IFWM triplets were initially proposed for use in time-domain perturbation pre/post-distortion (PPD) algorithm(s), which still requires a specific link condition and signal shaping/baud rates to analytically compute coefficients associated with each triplet.

In contrast, due to the nonlinear activation function in the neurons and multiple hidden layers, our NN architecture disclosed herein can advantageously explore the triplets' correlation thus constructing a better interaction among these triplets to have equivalent $6^{th}$-order and/or even $9^{th}$-order correlation.

Without computing triplets online, we again note that we demonstrate that low-complexity NN-NLC can be implemented at the transmitter by using look-up tables (LUT) capable of providing >0.5 dB Q improvement using single channel 32Gbaud dual-polarization (DP) 16QAM over 2800 km dispersion-unmanaged transmission. At similar complexity at the receiver side as filtered-DBP, we further experimentally show that NN-NLC achieves 0.15 b/s/2-polarization generalized mutual information (GMI) improvement over CDC only after 11,000 km field fiber transmission using probabilistically-shaped (PS) 64 quadrature amplitude modulation (64QAM).

Basic Principle

As will be appreciated by those skilled in the art, optical field evolution along the fiber can be characterized by NLSE:

$$\frac{\partial u_x(t, z)}{\partial z} + j\frac{\beta_2}{2}\frac{\partial^2 u_x(t, z)}{\partial t^2} = j\frac{8}{9}\gamma[|u_x(t, z)|^2 + |u_y(t, z)|^2]u_x(t, z) \quad (1)$$

where $u_{x/y}(t, z)$ is the optical field of x and y polarization, respectively, $\beta_2$ is the group velocity dispersion, and $\gamma$ is the nonlinear coefficient.

In first-order perturbation theory, the solution to Eq. (1) includes of both linear $u_{0,x/y}(t, z)$ and nonlinear perturbation $\Delta u_{x/y}(t, z)$ terms. Assuming much larger accumulated dispersion than symbol duration, the nonlinear perturbation terms for the symbol at t=0 can be approximated as:

$$\Delta u_x(0, z) = \sum_{m,n} P_0^{3/2}(H_n H_{m+n}^* H_m + V_n V_{m+n}^* H_m)C_{m,n} \quad (2)$$

where $P_0$, $H_m$ and $V_m$, and $C_{m,n}$ are, respectively, the launch power, symbol sequences for the x- and y-polarization, and nonlinear perturbation coefficients, m and n are symbol indices with respect to the symbol of interest $H_0$ and $V_0$. As will be appreciated by those skilled in the art, nonlinear perturbation coefficients $C_{m,n}$ can be analytically computed given the link parameters and signal pulse duration/shaping factors.

These IXPM and IFWM triplets are served as the underlying nonlinear interactions between symbols propagated in the fiber. As a result, they are applied to the NN models to predict the total nonlinearity in the received signals. This data pre-processing is found to be crucial for the successful prediction of fiber nonlinearity.

Figure 1B:
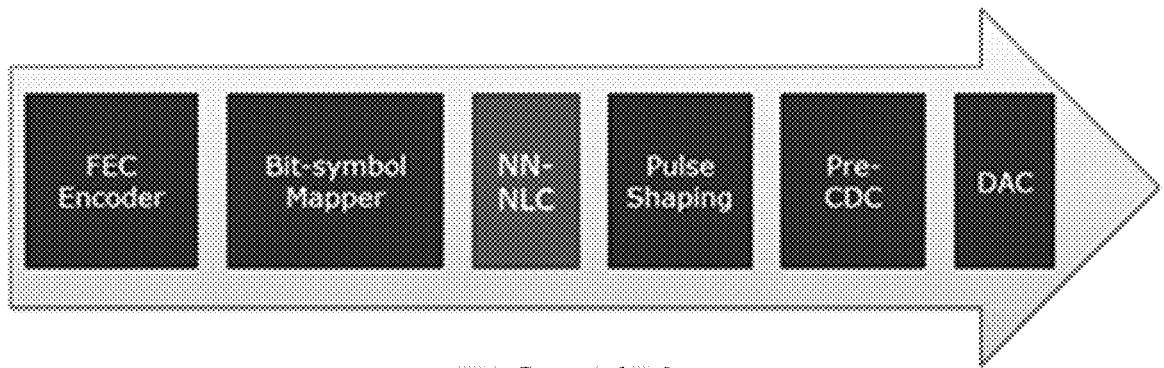
FIG. 1(B) is a schematic flow diagram illustrating digital signal processing (DSP) steps at a transmitter according to aspects of the present disclosure.

As we shall now show and describe, our NN-NLC algorithm according to the present disclosure is divided into two stages: training and execution stages. FIG. 1(A) is a schematic flow diagram illustrating digital signal processing (DSP) steps at a receiver according to aspects of the present disclosure. FIG. 1(B) is a schematic flow diagram illustrating digital signal processing (DSP) steps at a transmitter according to aspects of the present disclosure.

With reference to those figures, it may be observed that receiver operation involves: Analog-to-Digital conversion, followed by synchronization and resampling, followed by chromatic dispersion compensation; followed by polarization de-multiplexing, carrier phase recovery, neural network produced nonlinearity compensation, and finally forward error correction (FEC) decoding.

Training Stage

Setup Training Data

In order to characterize fiber nonlinearity, signal nonlinearity must be observed in received training data. Accordingly, launch power $P_0$ can be set beyond optimum channel power to permit nonlinearity noise to be dominant over ASE noise(s). In addition, de-noising averaging can be carried out for the fixed training data pattern to isolate data-dependent nonlinearity resulting from additive Gaussian ASE noises. At this stage of operation, the NN-NLC block operates on soft data from carrier phase recovery block shown in the receiver's DSP flowchart of FIG. 1(A). Later in the execution stage, the NN-NLC can be implemented at either the transmitter or the receiver side.

Figure 1C:
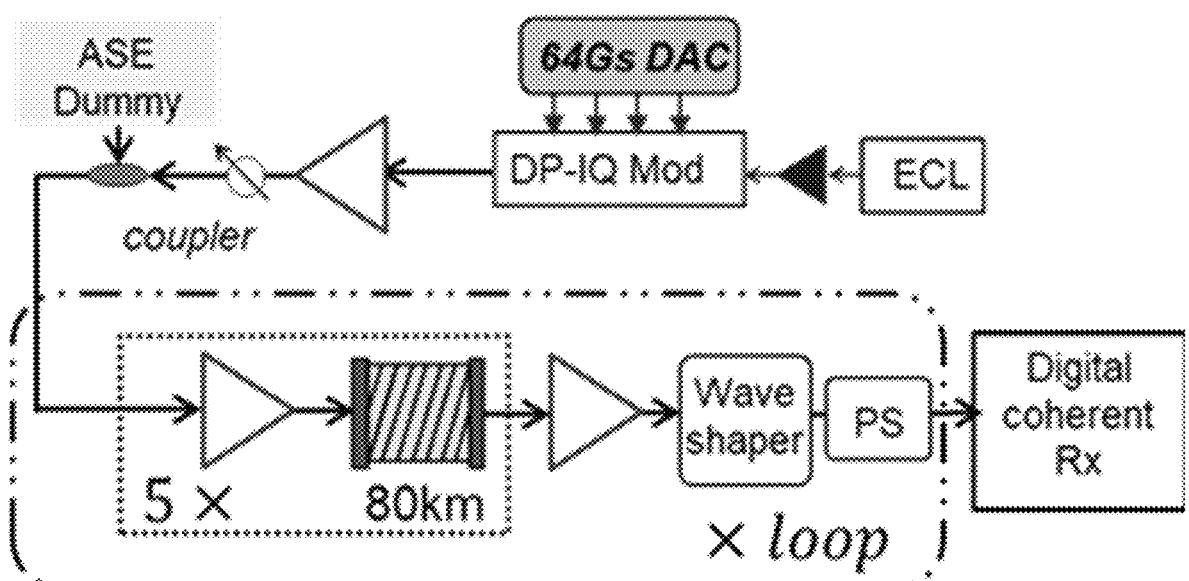
FIG. 1(C) is a schematic diagram illustrating a system setup of a transmitter and transmission loop according to aspects of the present disclosure.

To further elaborate our NN-ALC algorithm with experimental data, single-channel 32Gbaud DP-16QAM with RRC 0.01 pulse shaping as shown in FIG. 1(C) is generated using 64 Gs/s DAC and is transmitted over a loop testbed having five spans of 80 km SMF exhibiting 0.2 dB/km loss and 17 ps/nm/km dispersion. A digital coherent receiver running at 50-GSa/s with analog bandwidth of 20 GHz downsamples the optical waveforms for offline DSP as outlined in FIG. 1(A) to recover transmitted symbols. In addition, 50% chromatic dispersion compensation (CDC) has been applied at the transmitter to enhance the fiber nonlinearity tolerance.

Three uncorrelated datasets with ~115 k symbols each are generated for training, cross-validation (CV) and testing. The data pattern used in the training, CV and test datasets is measured to have maximum 0.6% normalized cross-correlation to ensure data independence.

Figure 2A:
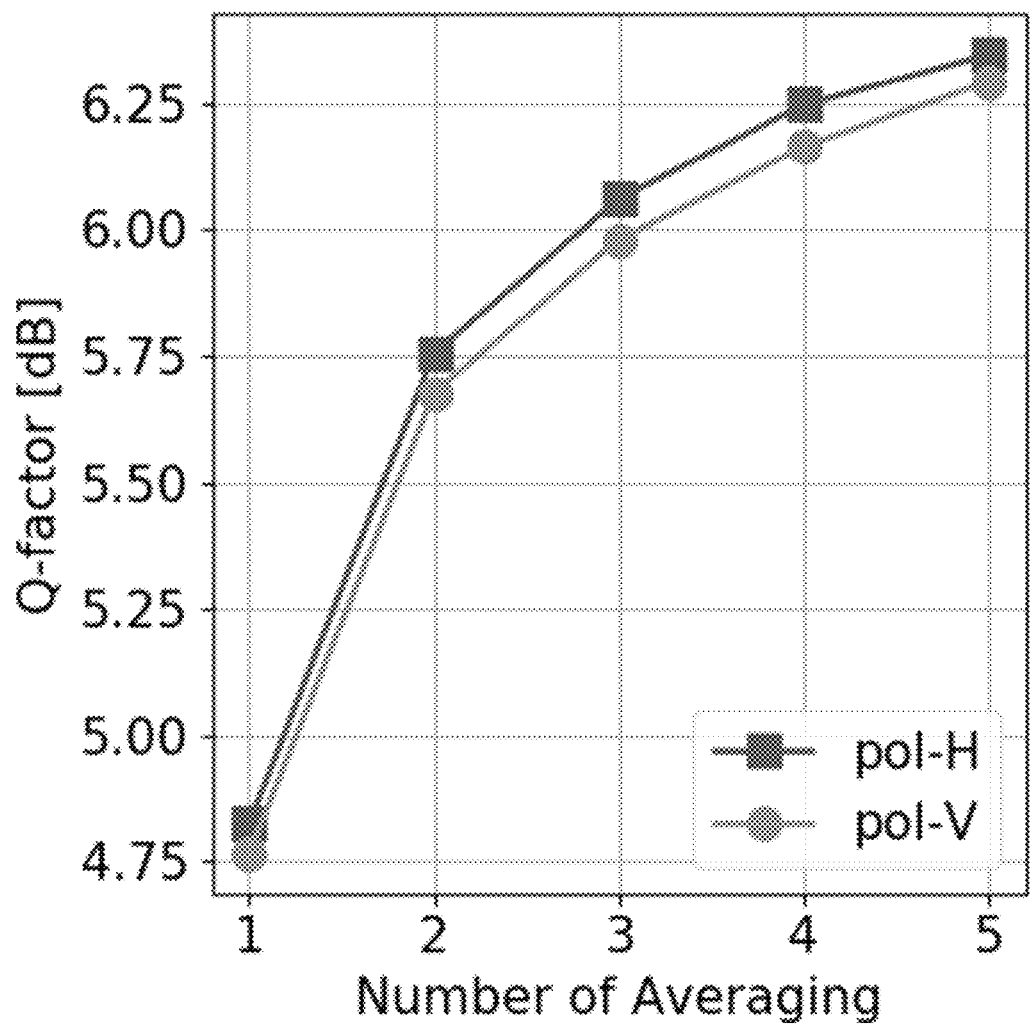
Figure 2B:
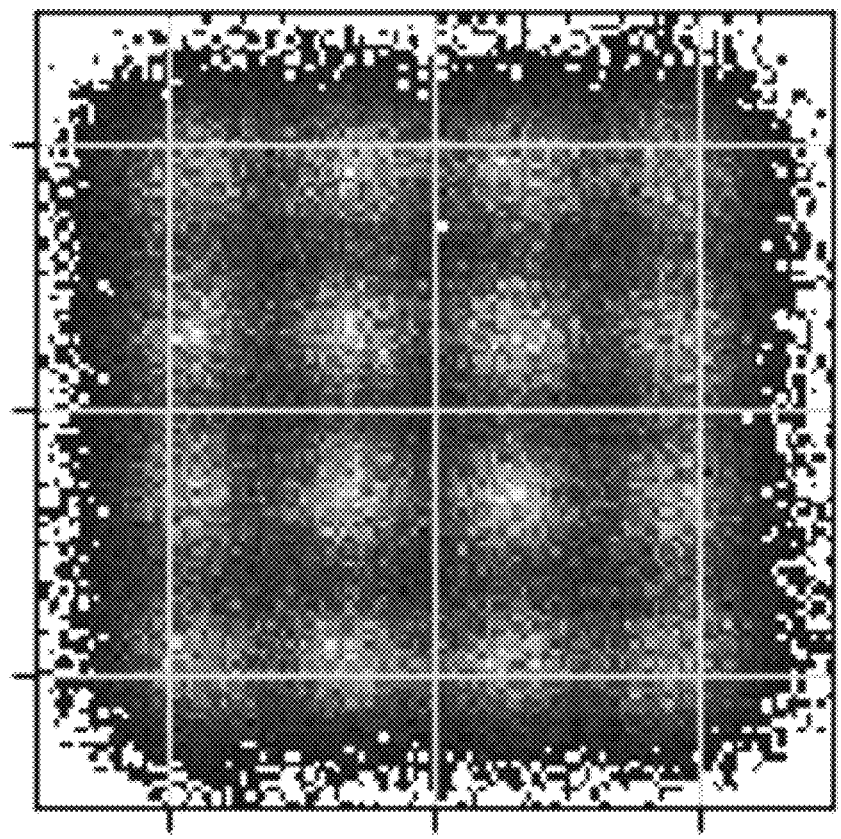
Figure 2C:
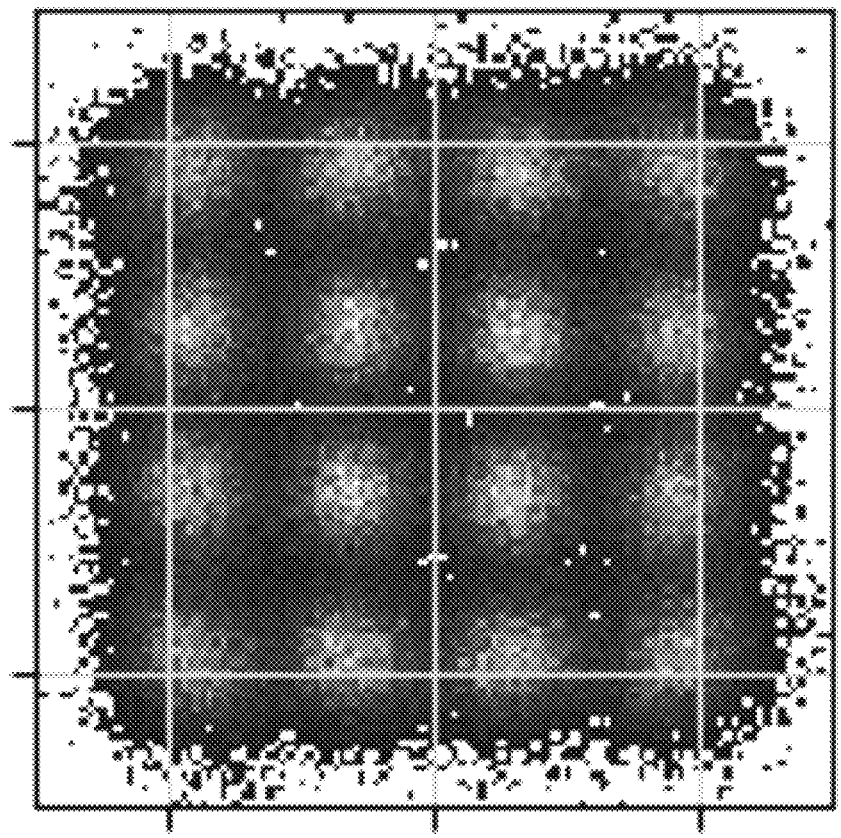

Multiple waveform acquisition is processed, and the recovered soft symbols after carrier phase recovery are aligned to average out the additive noise. FIG. 2 is a plot illustrating the impact of the number of acquired waveforms on the Q-factor and constellation of the training dataset received at ~2 dB higher channel power than the optimum after 2800 km transmission. As will be greatly appreciated by those skilled in the art, approximately 1.6 dB Q-factor improvement has been observed after only averaging over 5 acquired waveforms. Saturation curves show that the resulting cleaner constellation in FIG. 2(C) more accurately represents the nonlinear noise than the one shown in FIG. 2(B).

Triplets Selection

After cleaning up the ASE noises in the received training dataset, these data are ready to be used for computing the IXPM & IFWM triplets as described in Eq. (2). We note that in previous work, nonlinear perturbation coefficients $C_{m,n}$ are first analytically computed based on the link parameters and signal baudrate, and only those triplets with coefficients above a certain threshold are retained, i.e., $20 \log_{10}|C_{m,n}/C_{00}|>\kappa$. Note that the coefficients computed in the art were only used for selecting the triplets for feeding into the NN models.

Due in part to the hyperbola characteristic of the nonlinear perturbation coefficients $C_{m,n}$ at given m, here we select only those triplets based on the criteria:

$$|n| \le \min\left\{\frac{\rho\lceil L/2\rceil}{|m|}, \left\lceil\frac{L}{2}\right\rceil\right\} \quad (3)$$

where $\rho$ is a scaling factor to determine the width of triplet at edges $$\left(m = \pm\left\lceil\frac{L}{2}\right\rceil\right),$$

L is the symbol window length, $\lceil\bullet\rceil$ and $|\bullet|$ stands for rounding upper towards the nearest integer and absolute operation.

Figure 3A:
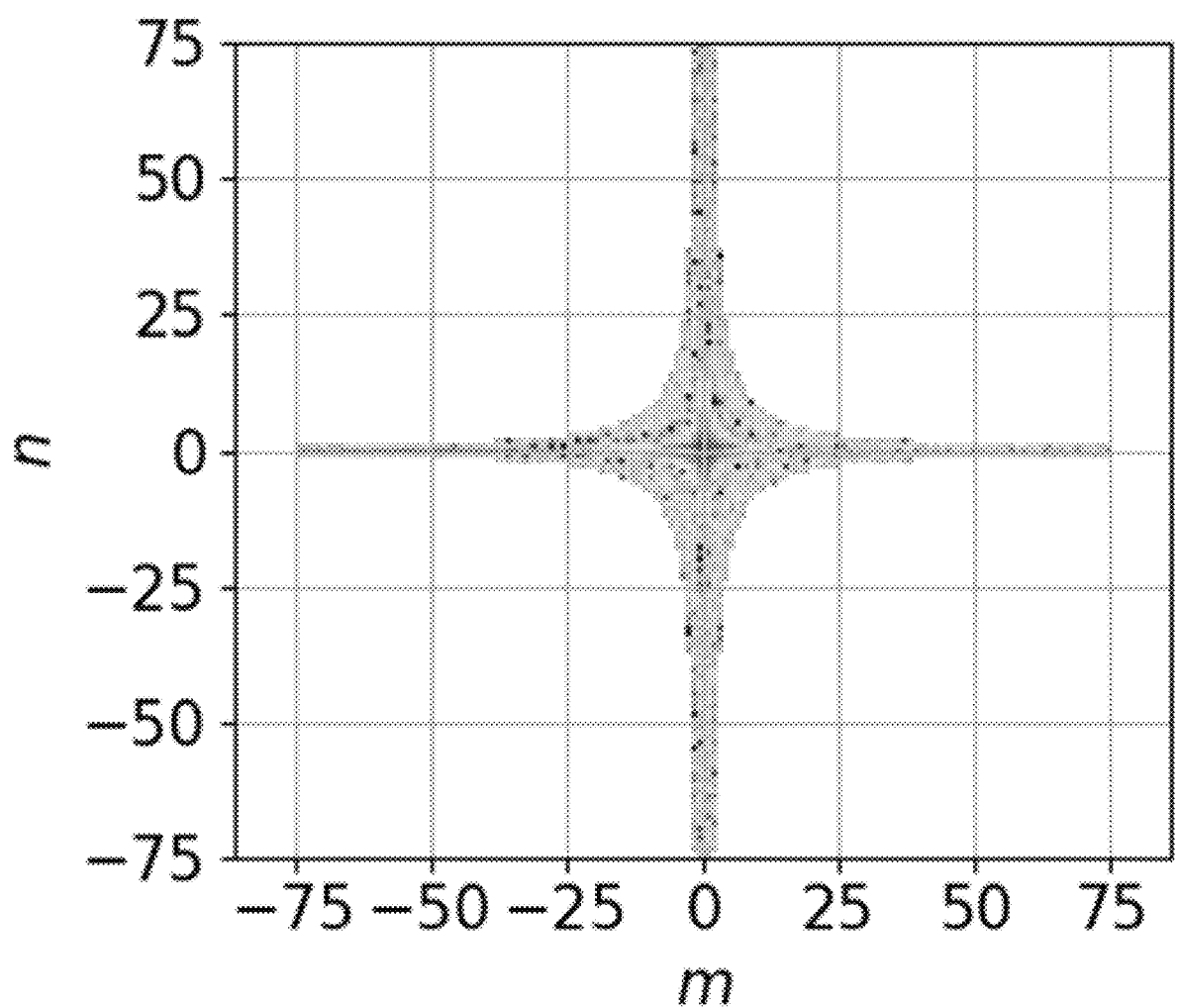
FIG. 3(A), FIG. 3(B), FIG. 3(C), and FIG. 3(D) illustrate density plot of an input layer weights o the neural network model at initial Nt-1929.

Using the de-noised training data with $\rho=1$, $L=151$ and $Nt=1929$, the density map of the tensor weights $W_{m,n}$ at the input layer after NN training is plotted in FIG. 3(A). As can be seen, the triplet's selection criterion in Eq. (3) allows our deep-learning algorithm to efficiently locate the important triplets rather than exploring all the $L^2$ triplets, thus significantly reducing the computation complexity and training time.

Model Selection

As will be readily understood and appreciated by those skilled in the art, there are various ML models from simple linear regression to sophisticated deep-learning models designed for solving all sorts of problems. Several models, such as linear regression, convolutional neural network, recurrent neuron network and fully connected neuron network, are implemented using TensorFlow, and their performance is quickly checked using our simulation data developed herein. As we now disclose, a fully connected neural network outperforms all other models.

Figure 3B:
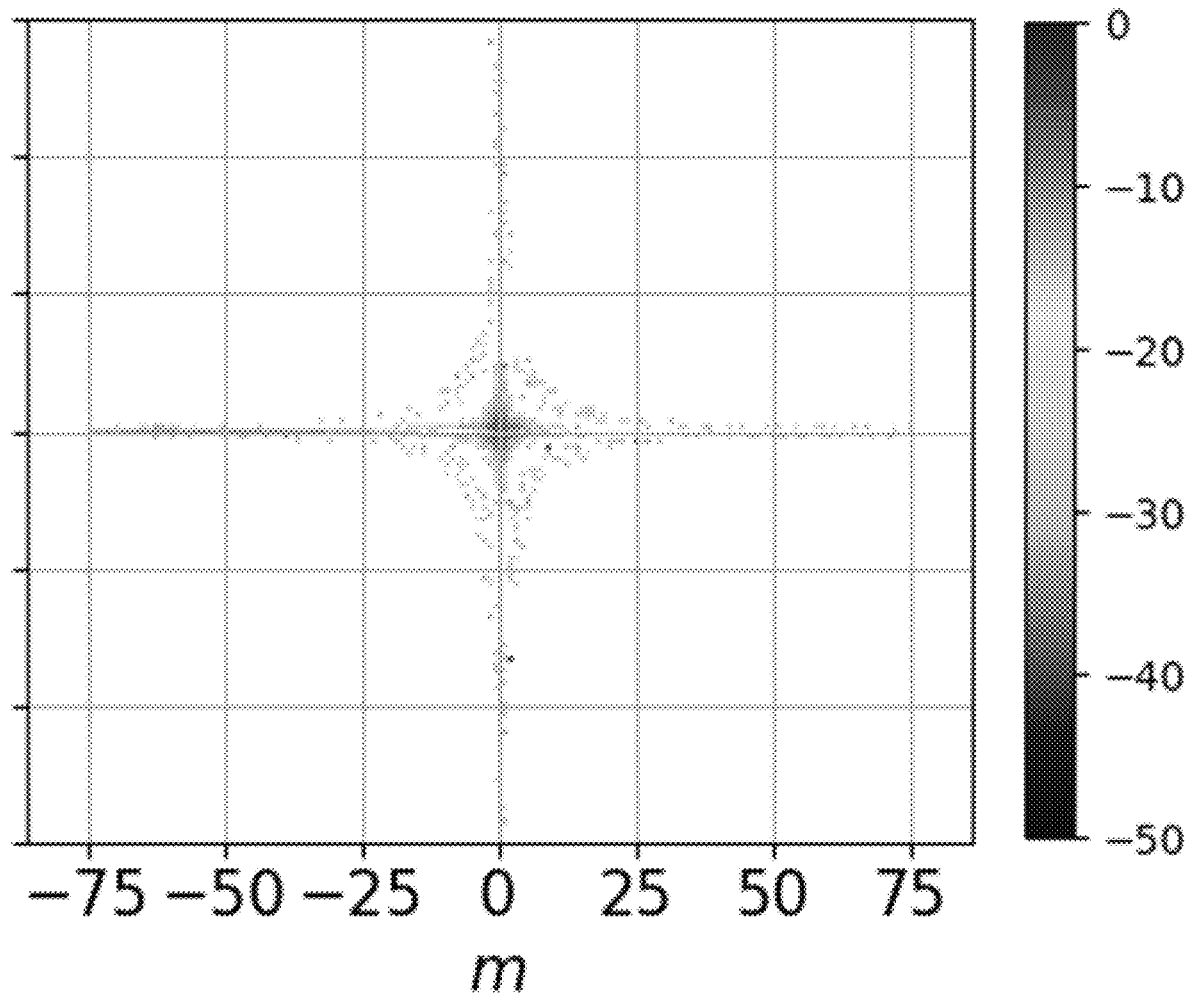
Figure 3C:
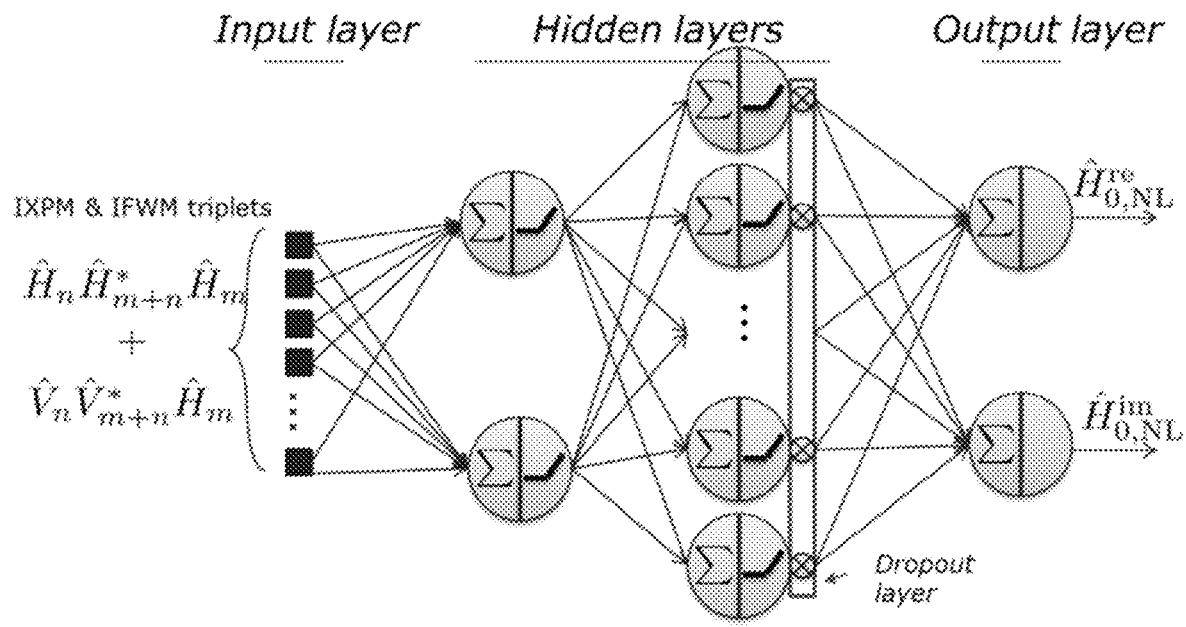

An optimized feedforward NN model according to the present disclosure is shown schematically in FIG. 3(C). As may be observed from that figure, it is constructed from an input layer with 2*Nt triplets nodes, 2 hidden layers consisting 2 and 10 nodes, respectively, and two output nodes corresponding to the real and imaginary of the estimated nonlinearity. Note that the triplets are separated into real and imaginary before being fed into the NN model.

The activation function SELU( ) is applied in the nodes of both hidden layers. A dropout layer with probability of 0.5 is placed after the $2^{nd}$ hidden layer during training only to avoid overfitting. Applying an Adam learning algorithm with a learning rate of 0.001 and batch size of B=100, the network is trained by transmitting known but randomly generated patterns, and searching for the best node tensor parameters that minimize the mean square error (MSE) between the transmitted and received symbols after NN-NLC, i.e., $$MSE = \frac{1}{B}\sum_{i=1}^{B} |H_i - (\hat{H}_i - \hat{H}_{i,NL})|^2 \qquad (4)$$

where $\hat{H}_i$ and $\hat{H}_{i,NL}$, respectively, are the received symbols and estimated nonlinearity for pol-H. Although the model is trained using pol-H data, the similar performance improvement is observed for the pol-V too. Note that the training can be done at much slower pace than data rate to allow deep-learning algorithm to locate the appropriate NN models and compute the optimum tensor weights prior to the execution stage.

Execution Stage

Figure 3D:
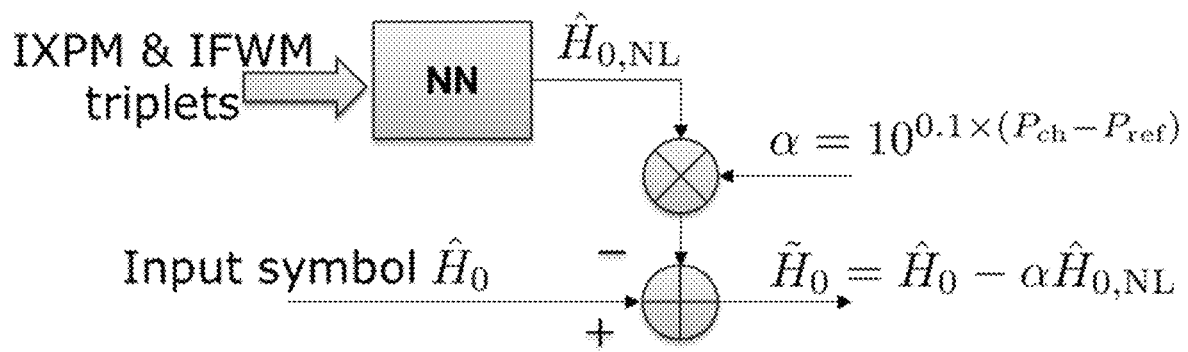

During the training stage, the performance of the model is checked against the CV dataset only to optimize the NN model parameters. Afterwards the learned model is applied to the uncorrelated test dataset for all channel powers in the execution stage. A block diagram of our NN-NLC according to the present disclosure is shown in FIG. 3(D).

Given the symbol of interest $\hat{H}_0$ centered at the middle of symbol length L, the IXPM and IFWM terms are calculated to feed into the NN model in FIG. 3(C) to estimate the nonlinearity. The estimated $\hat{H}_{0,NL}$ is first scaled by the channel power ($P_{ch}$) of the test dataset with respect to the reference channel power ($P_{ref}$) of the training data used for deriving the model, i.e., $$\alpha = 10^{0.1 \times (P_{ch} - P_{ref})} \qquad (5)$$

We note that the original symbol of interest is subtracted by the estimated $\hat{H}_{0,NL}$ before being sent for next DSP block, such as FEC decoding as illustrated schematically in FIG. 1(A).

Since the computation of triplets using the soft symbols could be quite expensive at the receiver side, it is desirable to move the NN-NLC block to the transmitter side to take advantage of the limited alphabet size M for each modulation format. As a result, a look-up table (LUT) can be created to store all the $M^3$ possible triplets. Of particular advantage, the LUT requires only $16^3 = 4096$ entries for 16QAM. The same NN model developed in the training stage using the receiver's symbols is demonstrated to be still effective at the receiver side. FIG. 1(B) shows the DSP block diagram of the NN-ALC at the transmitter side.

Complexity and Performance

Since the complexity of real multiplications could be 4 times as much as an addition operation, only real multiplication will be taken into account when comparing the complexity of the NLC algorithm. The NN model according to the present disclosure shown in FIG. 3(C) requires $$2N_t \times 2 + 2 \times 10 + 10 \times 2 = 4N_t + 40 \qquad (6)$$

real multiplications because of three cross-layer tensor interaction. Note that the activation function SELU( ) in the hidden nodes and IXPM/IFWM triplets computation are assumed to be implemented in LUT.

After scaling the estimated nonlinearity term, the number of real multiplication per symbol for our NN-ALC according to aspects of the present disclosure shown in FIG. 3(D) is summarized as:

$$4N_t + 40 + 2 = 4N_t + 42 \qquad (7)$$

Therefore, reducing the number of triplets $N_t$ will the most effective way to lower the complexity of the NN-ALC algorithm in our model.

As shown in FIG. 3(A), with the initial $N_t = 1929$ triplets, some of the input tensor weights $W_{m,n}$ in the trained model show much smaller contribution to the signal nonlinearity than the center ones. As a result, the number of triplets $N_t$ can be further reduced by only keeping those weights larger than a threshold κ, i.e., 20 $\log_{10}|W_{m,n}/W_{00}| > \kappa$.

Figure 4A:
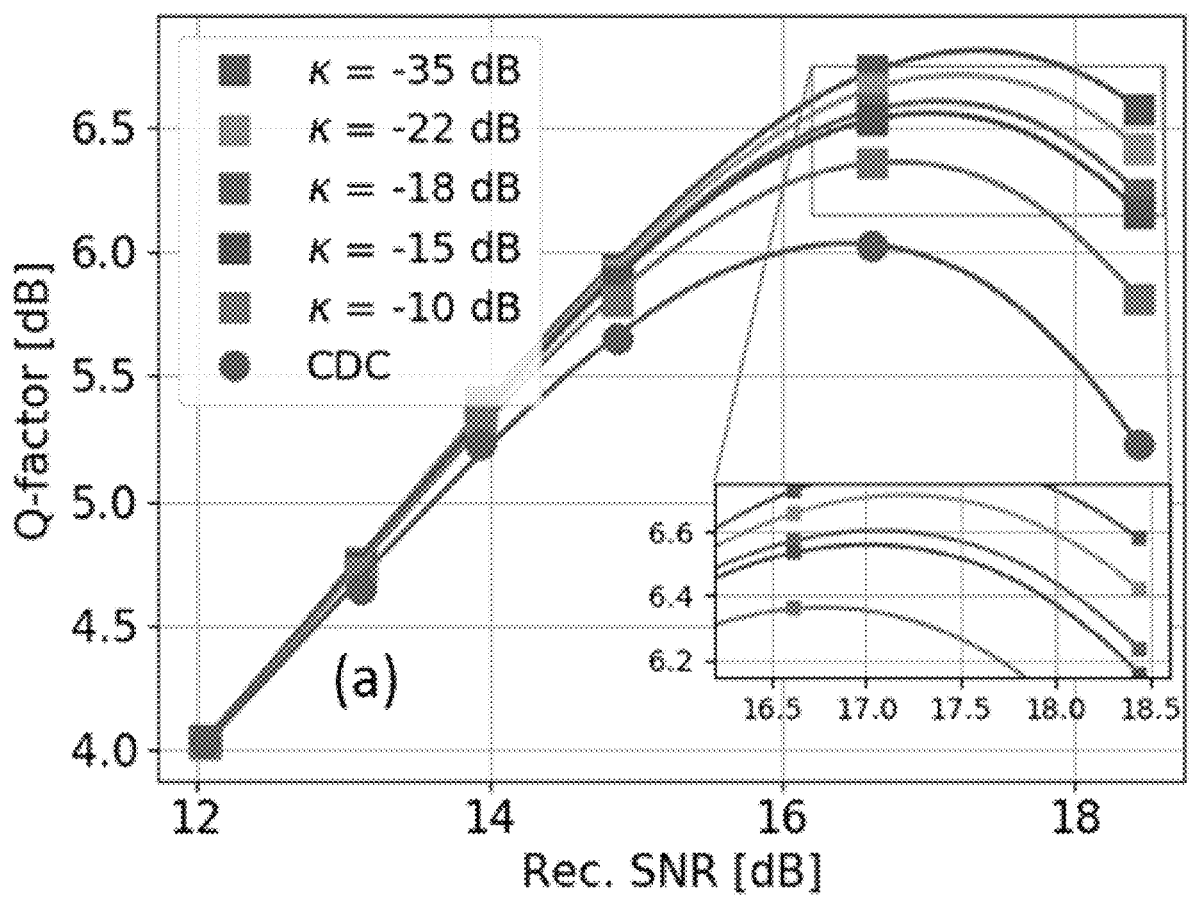
FIG. 4(A), FIG. 4(B), FIG. 4(C), FIG. 4(D), and FIG. 4(E) are plots illustrating.

After trimming off the weights $W_{m,n}$ that are less than κ=−22 dB shown in FIG. 4(A), the remaining 615 triplets are re-trained in the NN model and a new density plot of the input tensor weights $W_{m,n}$ is shown in FIG. 3(B).

FIG. 4(A) is a plot illustrating the impact of the trimming threshold κ on the performance improvement of the NN-NLC as a function of received SNR after 2800 km transmission. At the optimum received SNR, the NN-NLC algorithm at trimming threshold κ<−15 dB achieves >0.5 dB Q improvement over CDC. The more Q improvement at the highest received SNR further confirms our NN model accurately predicts the signal nonlinearity. By adjusting the trimming threshold κ from −35 dB to −15 dB, as shown in a zoom inset of FIG. 4(A), it may be observed that the performance tradeoff within ~0.2 dB and ~0.4 dB Q variation, respectively, at received SNR of 16.6 dB and 18.4 dB.

As disclosed previously herein with respect to methods according to the present disclosure, the transmitter-side NN-NLC has the advantage of avoiding the computation of triplets using LUT thereby reducing complexity. Additionally, since our NN model works on a clean transmitted symbol, the Q improvement of NN-NLC over CDC is higher than one at the receiver side. Finally, an additional advantage is that the receiver DSP algorithm works on signals with less nonlinearity, thereby reducing cycle slip rate.

Figure 4B:
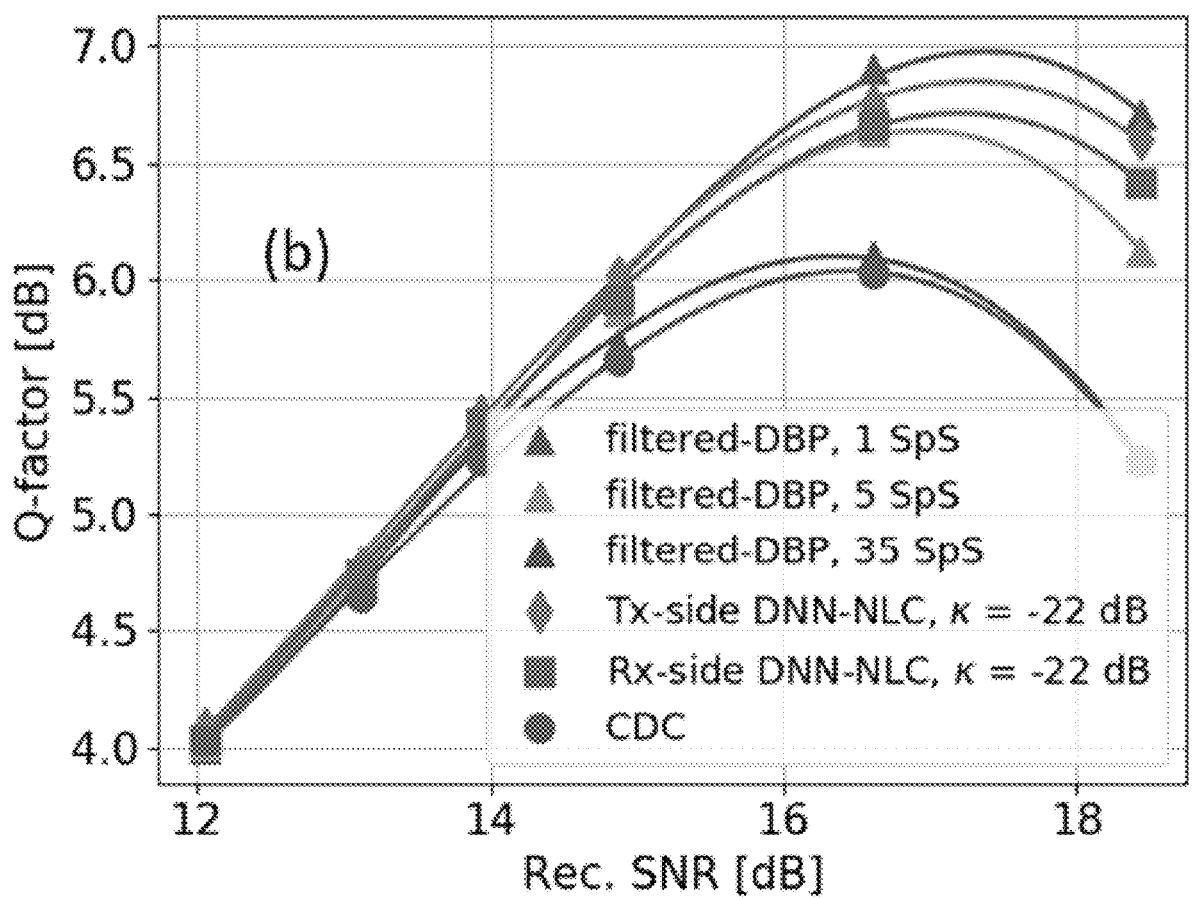
Figure 4C:
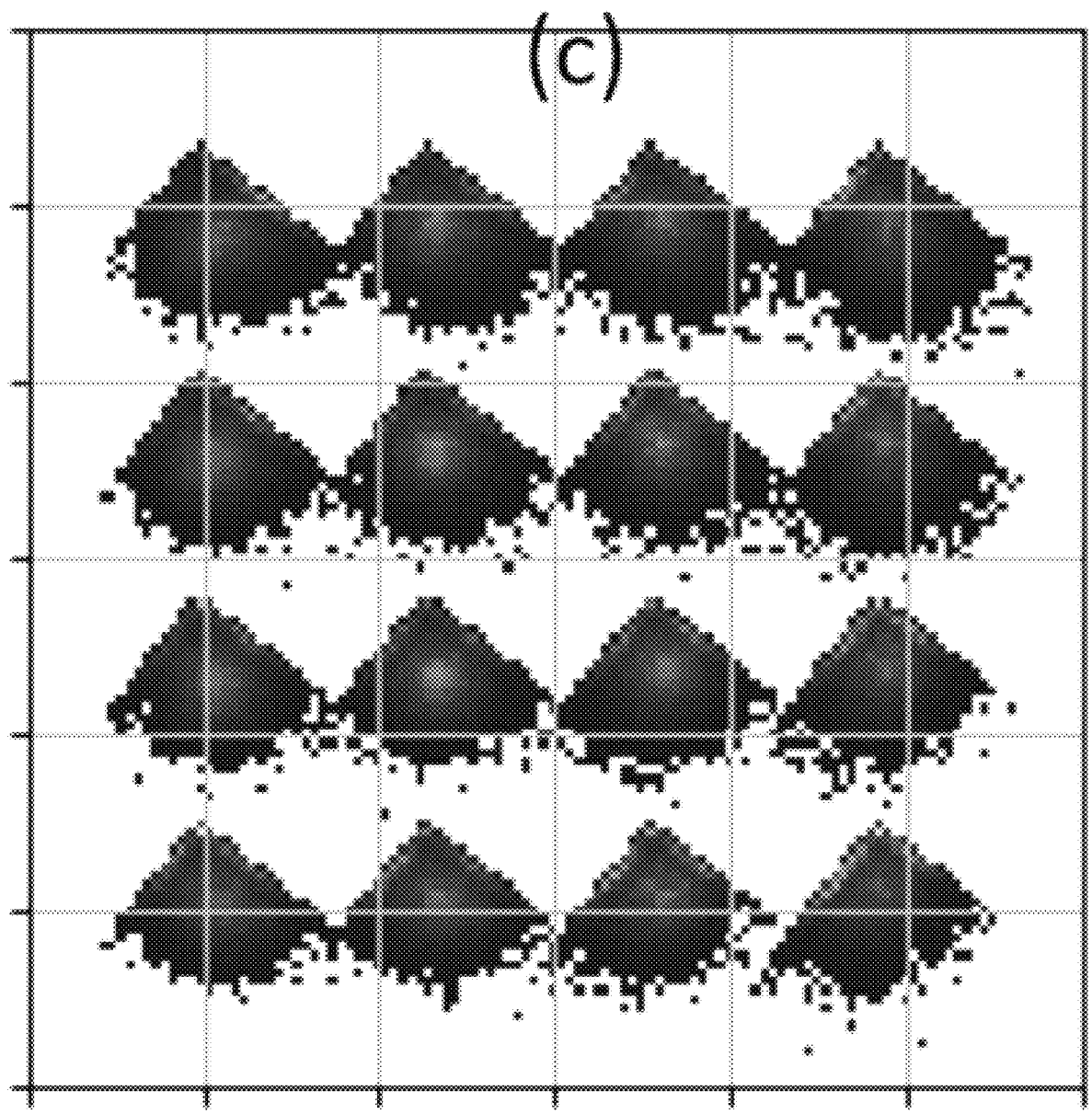
Figure 4D:
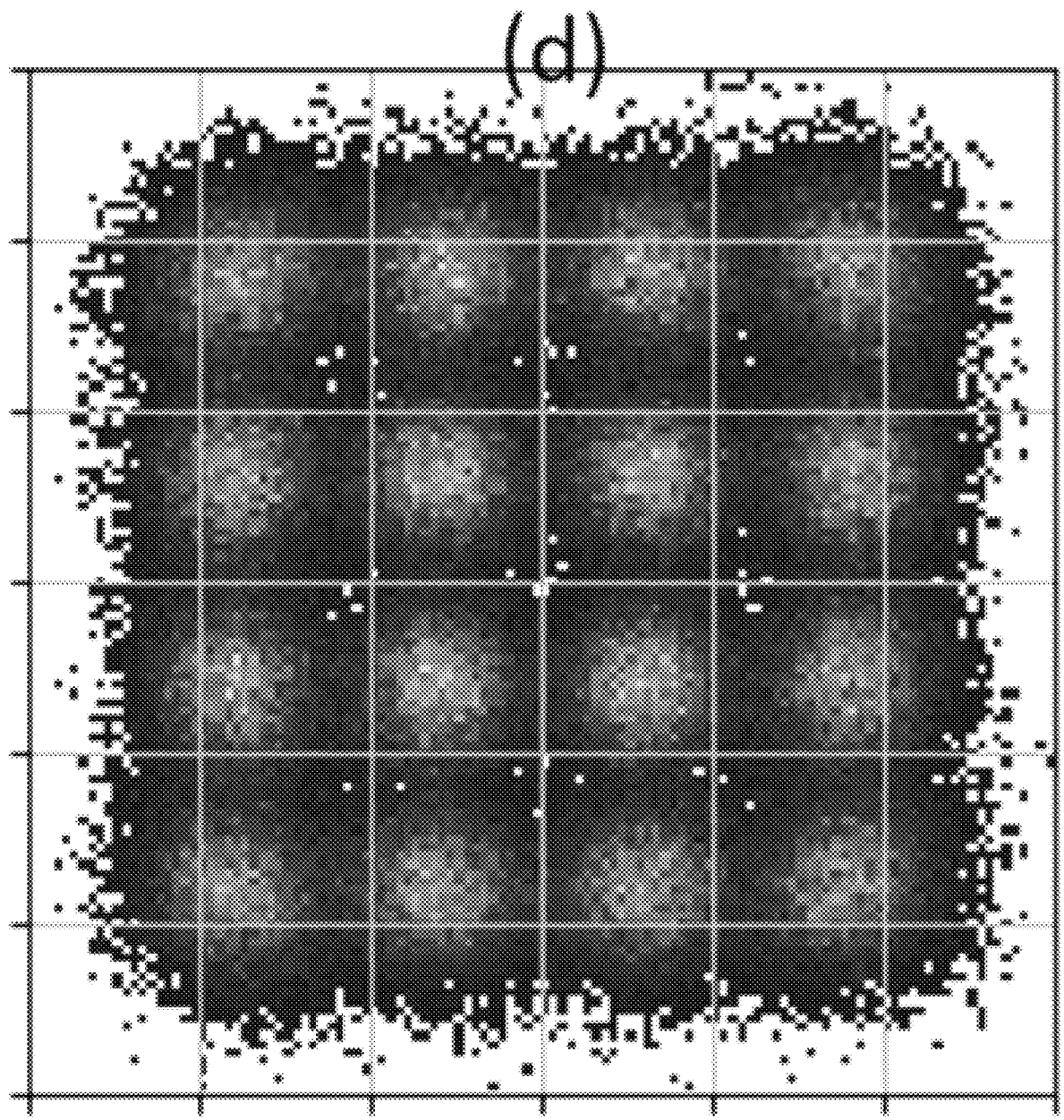
Figure 4E:
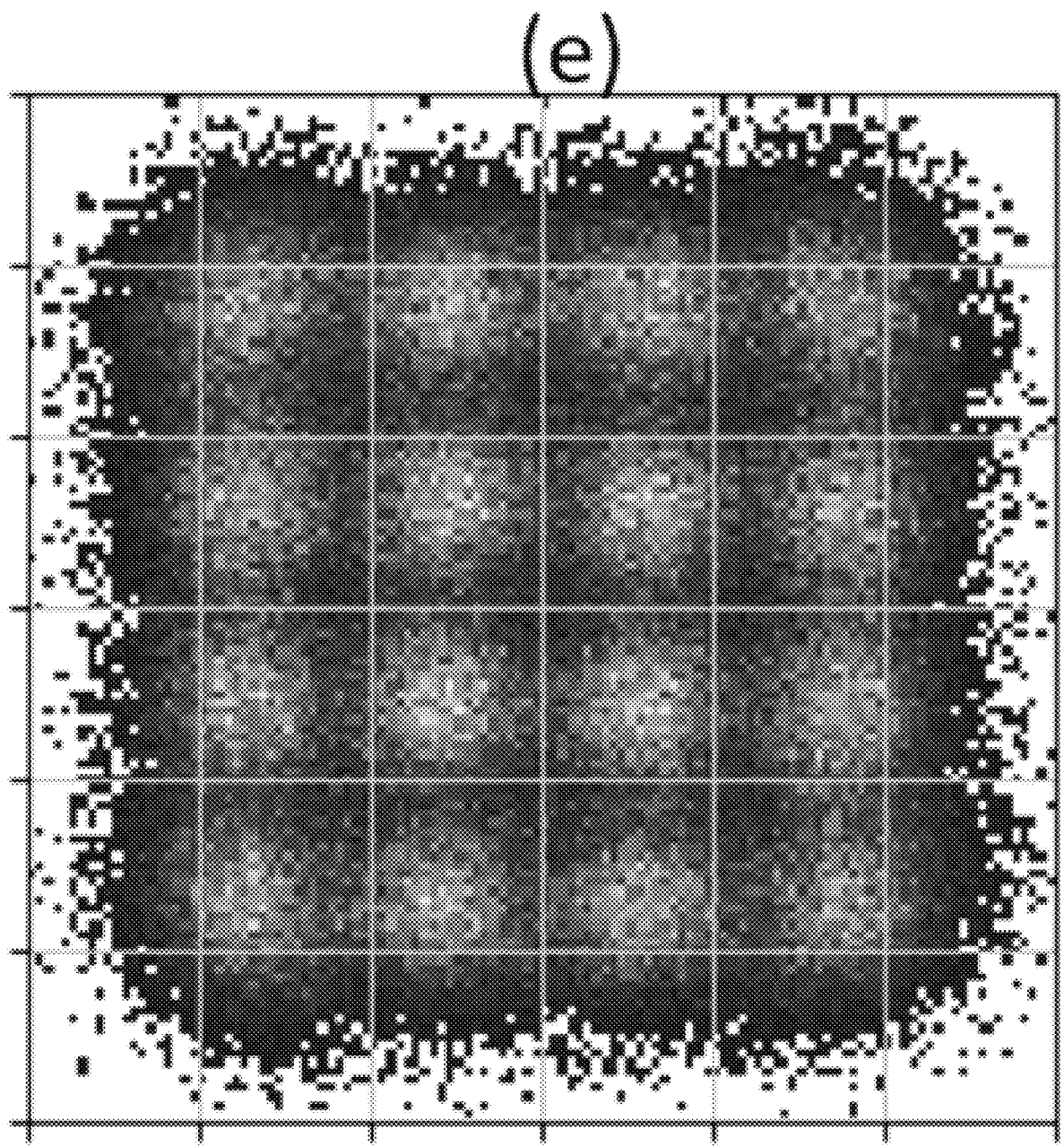

With these in mind, when applying the NN model derived with trimming threshold κ=−22 dB at the receiver side to the original 16QAM symbols in the test dataset, the pre-distorted symbol constellation is plotted in FIG. 4(C). Interestingly, the pre-distorted symbols are not Gaussian-like due to the asymmetric nonlinearity interaction between left plane and right plane shown in FIG. 3(B). Compared to the recovered constellation without NN-NLC algorithm shown in FIG. 4(E), the transmitter-side NN-NLC can significantly improve the constellation quality as plotted in FIG. 4(D). As compared to the Rx-side NN-NLC at the trimming threshold κ=−22 dB, FIG. 4(B) shows ~0.1 dB Q improvement when moving the NN-NLC to the transmitter side thanks to the undistorted transmitter symbols.

We note at this point that filtered-DBP is a well-known technique disclosed in the prior art literature to balance a tradeoff between performance and computation complexity. Since multiple spans are emulated in each DBP step, the intensity waveforms must be filtered by a Gaussian low-pass filter (LPF) prior to being used for de-rotating signal phase. Its optimal bandwidth is found to be 5 GHz, 1 GHz, 1 GHz and 0.5 GHz for 1, 5, 7 and 35 spans per step (SpS). The optimum scaling factor ξ used to de-rotate the signal's phase is about 0.7 for all cases.

As compared to our single-step NN-NLC of the present disclosure, single-step filtered-DBP (35 SpS) is outperformed by >0.6 dB. From the measurement results, filtered-DBP needs at least 7 steps, i.e., 5 SpS, to achieve a performance of Rx-side NN-NLC at κ=−22 dB.

Figure 5:
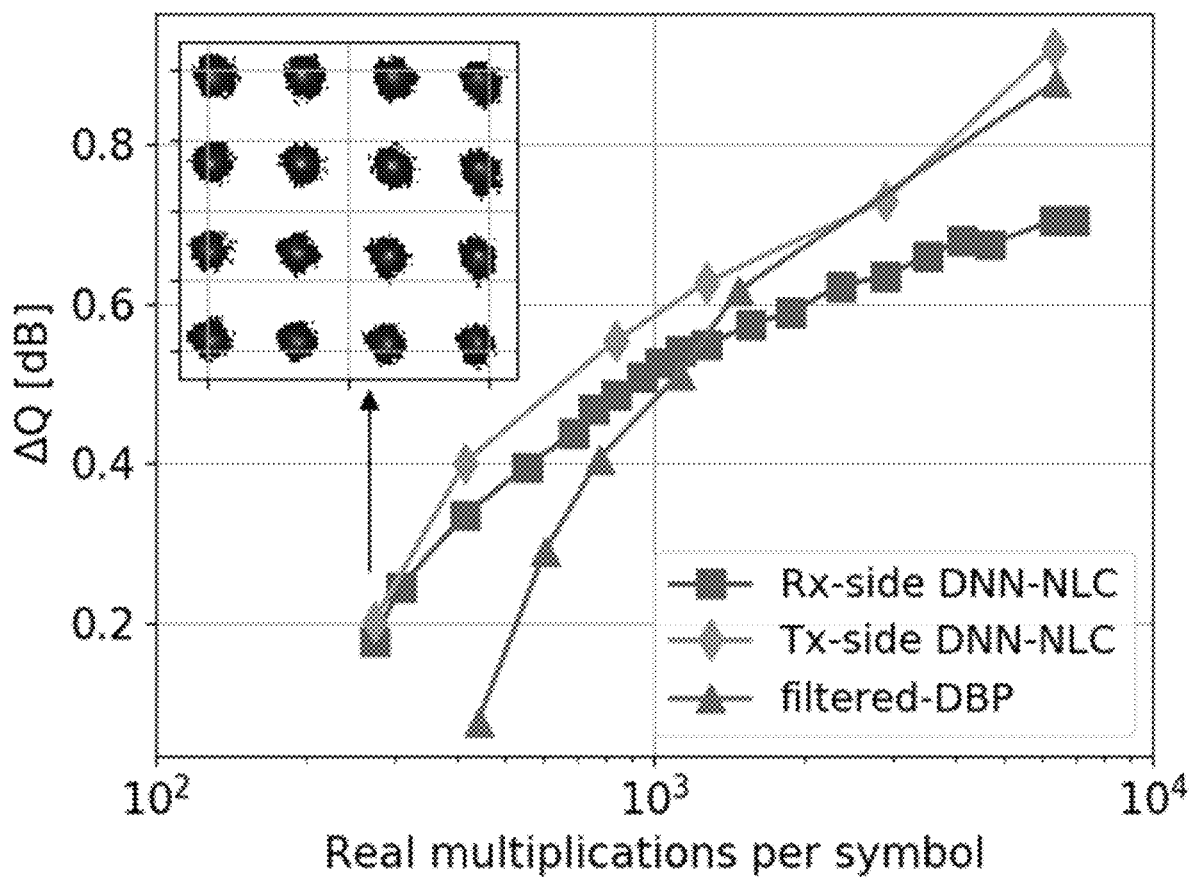
FIG. 5 is a plot illustrating delta-Q (dB) vs. real multiplications per symbol according to aspects of the present disclosure.

The Q performance improvement over CDC is plotted in FIG. 5 versus real multiplications per symbol for filtered-DBP and both Tx/Rx-side NN-NLC algorithm. Since filtered-DBP carries out CDC and NLC at the same time, for fair comparison, the number of real multiplications per symbol required in the Rx-side CDC block (see FIG. 1(a)) has to be included for NN-NLC algorithm, given by $$\frac{8n(1 + \log_2 n)}{n - n_{CD} + 1} \quad (8)$$

where n is the FFT size and $n_{cd}$ is the minimum number of CDC equalizers required to compensate for the accumulated CD. CDC is assumed to be performed in frequency domain with FFT size n=4086. To compensate for the 50% residual CD at the receiver side, additional ~115 real multiplications are added per symbol on top of the complexity of NN-NLC given in Eq. (7).

In general, the Rx-side of our NN-NLC according to the present disclosure performs better than filtered-DBP only when the computation complexity is less than ~1000 real multiplications per symbol. When moving the NN-NLC algorithm to the transmitter side, it equals or exceeds the performance of filtered-DBP even at higher complexity than 1000 real multiplications per symbol while still exhibiting the performance advantage at lower complexity over filtered-DBP. As we have observed, Tx-side NN-NLC loses its performance advantage over Rx-side when the complexity is too low because of lack of tracking signal nonlinearity.

The inset of FIG. 5 shows the pre-distorted symbols with only Nt=29 triplets, which is significantly different from those shown in FIG. 4(C) using 615 triplets.

Figure 6A:
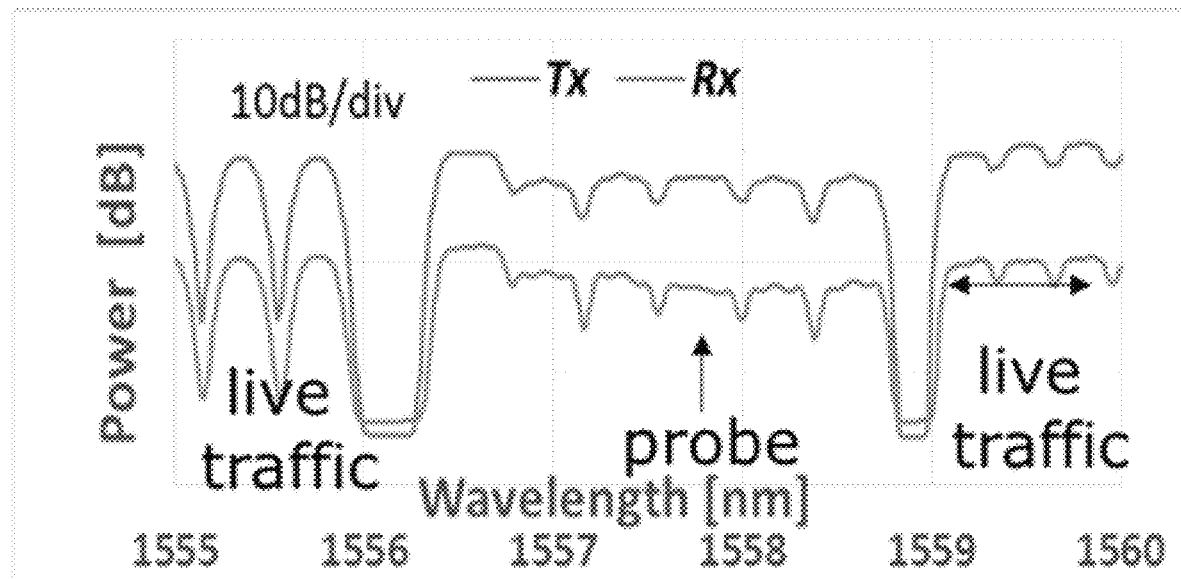
FIG. 6(A), FIG. 6(B), FIG. 6(C), and FIG. 6(D) are plots illustrating.
Figure 6B:
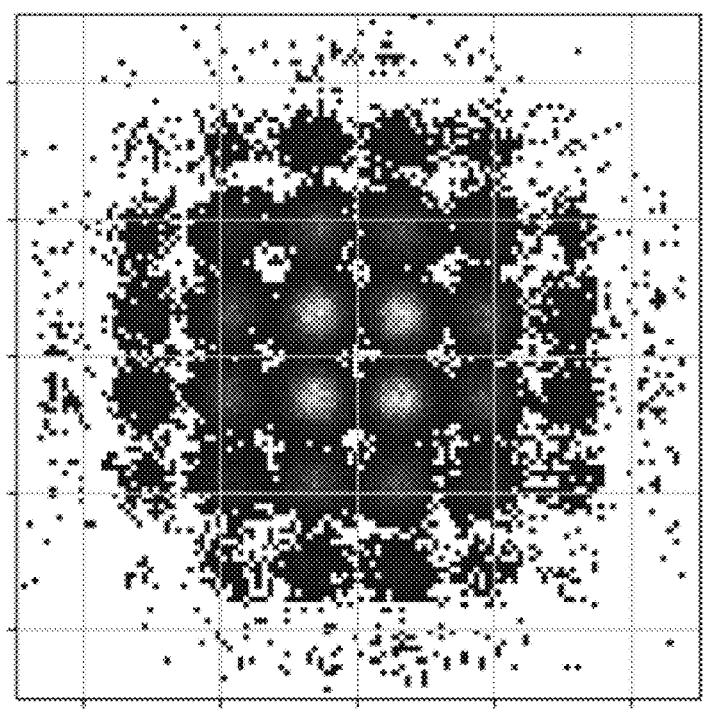

The performance of NN-NLC is further demonstrated on an 11,017 km commercial FASTER submarine cable together with live traffic. Digital subcarrier modulation (DSM) 4×12.25Gbaud PS-64QAM at RRC 0.01 with 50 MHz guard band carrying in total 300 Gb/s bit rate is used as the probe signal in 50 GHz WDM configuration. The transmitter and receiver spectra are plotted in FIG. 6(A). After applying de-noising average approach, the received PS-64QAM constellation at 2 dB channel pre-emphasis is shown in FIG. 6(B). Note that generalized mutual information (GMI) is used for accurately measuring the gain of NN-NLC for PS-64QAM format.

Figure 6C:
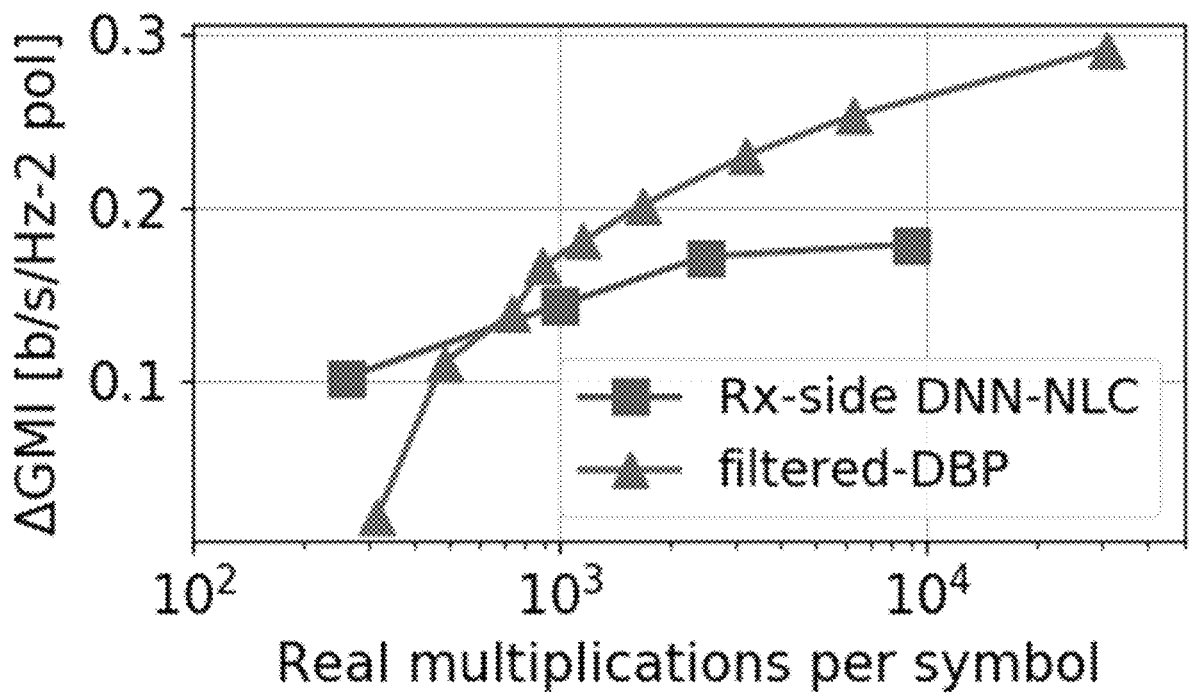
Figure 6D:
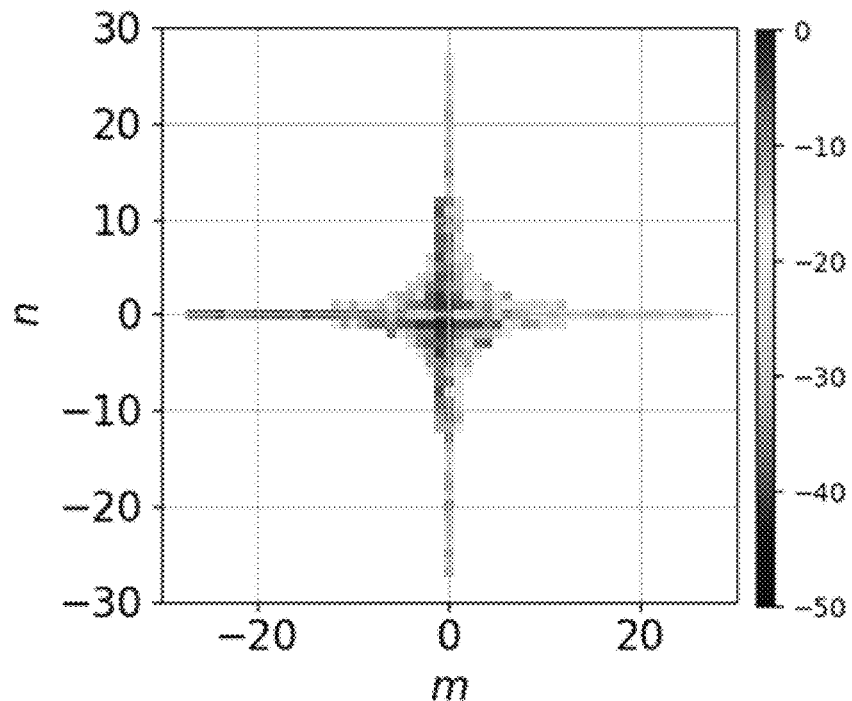

FIG. 6(C) compares the performance of NN-NLC and filtered-DBP with respect to the CDC only as a function of computation complexity. The reference is the GMI with CDC only. The similar trend is found that NN-NLC performs better than filtered-DBP when the complexity is less than 730 real multiplications per symbol. It is expected that Tx-side NN-NLC is likely to further improve the performance gain. FIG. 6(D) plots the density map of the input-layer nodes weights after training with 240 triplets.

As will now be appreciated and understood by those skilled in the art, our NN-NLC according to aspects of the present disclosure is experimentally demonstrated in both lab testbed and field cables to exhibit system-agnostic performance without prior knowledge of the transmission link parameters such as dispersion, fiber nonlinearity and fiber length.

At this point, while we have presented this disclosure using some specific examples, those skilled in the art will recognize that our teachings are not so limited. Accordingly, this disclosure should be only limited by the scope of the claims attached hereto.

The invention claimed is:

1. An improved nonlinearity compensation (NLC) method for optical transmission networks employing a neural network (NN-NLC) said improved NN-NLC method CHARACTERIZED IN THAT:
   the NN-NLC is performed without a knowledge of transmission link parameters;
   said NN fed with intra-channel cross-phase modulation (IXPM) and intra-channel four-wave mixing (IFWM) triplets, said triplets selected according to the following criteria:

$$|n| \leq \min\left\{\frac{\rho\lceil L/2\rceil}{|m|}, \lceil\frac{L}{2}\rceil\right\}$$

where ρ is a scaling factor to determine the width of triplets at edges $$\left(m = \pm\lceil\frac{L}{2}\rceil\right),$$

L is symbol window length, ⌈•⌉ and |•| are rounding upper towards nearest integer and absolute operation, respectively.

2. The improved method of claim 1 FURTHER CHARACTERIZED IN THAT:
   the unknown link parameters are ones selected from the group consisting of: optical dispersion, fiber nonlinearity and span length.

3. The improved method of claim 2 FURTHER CHARACTERIZED IN THAT:
   the optical transmission network is a software-defined mesh network.

4. The improved method of claim 3 FURTHER CHARACTERIZED IN THAT:
   the NN-NLC includes both training and execution stages.

5. The improved method of claim 4 FURTHER CHARACTERIZED IN THAT:
   the NN-NLC execution stage is performed only at a transmitting side of a transmission link.

6. The improved method of claim 5 FURTHER CHARACTERIZED IN THAT:
   the NN-NLC training stage is performed operating on soft data obtained from carrier phase recovery in a receiver's digital signal processor (DSP).

7. The improved method of claim 6 FURTHER CHARACTERIZED IN THAT:
   the NN-NLC training stage checks performance of a neural network model against a cross-validation (CV) dataset to generate a learned model.

8. The improved method of claim 6 FURTHER CHARACTERIZED IN THAT:
   the learned model is applied to data for all channel powers in the execution stage.

9. An improved nonlinearity compensation method for optical networks employing a neural network having training and execution stages said improved method comprising:
   during the training stage, generating a neural network model by operating on soft data from carrier phase recovery in a receiver digital signal processor;
   evaluating performance of the model with a cross-validation dataset to generate a learned model;
   training the learned model by transmitting known but randomly generated patterns and searching for a best node tensor parameter that minimize mean square error (MSE) between transmitted and received symbols given by:

$$MSE = \frac{1}{B}\sum_{i=1}^{B} |H_i - (\hat{H}_i - \hat{H}_{i,NL})|^2,$$

where $\hat{H}_i$ and $\hat{H}_{i,NL}$ and respectively, are the received symbols and estimated nonlinearity for polarization H (pol-H), $H_i$ is the transmitted symbol, and $|.|$ is an absolute operation;

applying intra-channel cross-phase modulation (IXPM) and intra-channel four-wave mixing (IFWM) triplets to the neural network, to estimate the nonlinearity, without prior knowledge of transmission link parameters;

said triplets selected according to the following criteria:

$$|n| \le \min\left\{\frac{\rho\lceil L/2\rceil}{|m|}, \lceil\frac{L}{2}\rceil\right\}$$

where ρ is a scaling factor to determine the width of triplets at edges $$\left(m = \pm\lceil\frac{L}{2}\rceil\right),$$

L is symbol window length, $\lceil \bullet \rceil$ and $|\bullet|$ are rounding upper towards nearest integer and absolute operation, respectively.

10. The improved nonlinearity compensation method of claim 9 wherein the neural network model generated during the training stage is applied to one of a transmitter and the receiver.

* * * * *